United States Patent
Ibaraki et al.

(10) Patent No.: US 8,419,851 B2
(45) Date of Patent: Apr. 16, 2013

(54) SULFATE RESISTANT CEMENT

(75) Inventors: Tetsuharu Ibaraki, Tokyo (JP); Yukihiko Nagao, Tokyo (JP)

(73) Assignee: Nippon Steel & Sumitomo Metal Corporation, Tokyo (JP)

(*) Notice: Subject to any disclaimer, the term of this patent is extended or adjusted under 35 U.S.C. 154(b) by 565 days.

(21) Appl. No.: 12/530,138

(22) PCT Filed: Mar. 6, 2008

(86) PCT No.: PCT/JP2008/054547
§ 371 (c)(1), (2), (4) Date: Sep. 4, 2009

(87) PCT Pub. No.: WO2008/111621
PCT Pub. Date: Sep. 18, 2008

(65) Prior Publication Data
US 2010/0101458 A1 Apr. 29, 2010

(30) Foreign Application Priority Data
Mar. 6, 2007 (JP) .................. 2007-055986

(51) Int. Cl.
*C04B 11/00* (2006.01)

(52) U.S. Cl.
USPC ........... 106/713; 106/714; 106/715; 106/772; 106/789

(58) Field of Classification Search .......... 106/713, 106/714, 715, 772, 789
See application file for complete search history.

(56) References Cited

FOREIGN PATENT DOCUMENTS

| JP | 1-275456 A | 11/1989 |
|---|---|---|
| JP | 4-238847 A | 8/1992 |
| JP | 8-12387 A | 1/1996 |
| JP | 8-268736 A | 10/1996 |
| JP | 2001-220197 A | 8/2001 |
| JP | 2004-59396 A | 2/2004 |
| JP | 2005-35877 A | 2/2005 |

OTHER PUBLICATIONS

Yoshio Kasai, "The Concrete", first edition, Gijyutsu Syoin Co., Ltd., Jun. 10, 1998, pp. 68 to 71, Tokyo, Japan.
Japanese Office Action, dated Feb. 15, 2012, for Japanese Patent Application No. 2007-055986.

*Primary Examiner* — Paul Marcantoni
(74) *Attorney, Agent, or Firm* — Birch, Stewart, Kolasch & Birch, LLP

(57) ABSTRACT

Mixed cement containing mainly ground granulated blast furnace slag with an alumina ratio of 12 to 17.5 mass % and Portland cement, wherein a ratio of mixture of the ground granulated blast furnace slag is made 10 to 60 mass % and wherein plaster having a specific surface area of 7000 $cm^2/g$ or more is mixed in by a ratio of 2 to 4 mass % converted to $SO_3$ mass. By using this mixed cement as a concrete material, it is possible to suppress expansion of the concrete even if in contact with soil containing residual sulfates over a long period.

10 Claims, 1 Drawing Sheet

SULFATE RESISTANT CEMENT

TECHNICAL FIELD

The present invention relates to cement having as its main ingredient a mixture of Portland cement and high alumina ground granulated blast furnace slag durable against sulfates and having a sulfate resistance performance. Furthermore, it relates to mixed cement with a high sulfate durability produced using low calcium aluminate Portland cement and high alumina ground granulated blast furnace slag.

The structures at which these cements can be used, for example, are structures constructed in soils containing sulfates where they are used as concrete or mortar, structures where entry of sulfate ions from seawater becomes a problem when used as concrete or mortar, and structures in contact with water treated at sewage treatment plates and other water containing sulfate ions when used as concrete or mortar.

BACKGROUND ART

Portland cement, blast furnace slag cement, and other cement are being widely used as soil reinforcers and as cement concrete for civil engineering structures or buildings.

As an advantage of cement, by pouring mortar or fresh concrete obtained by mixing a mixture of cement and aggregate with water into forms etc., it is possible to produce various shapes of structures and possible to produce concrete structures with high compressive strengths.

Further, cement can be produced by firing the limestone and clay present in large quantities and can be used mixed with blast furnace slag, fine ash, or other byproducts of other industries, so there is the advantage that it can be supplied inexpensively in large amounts.

Due to these advantages, cement is one of the most greatly used industrial products.

In cement, blast furnace slag cement is ground granulated blast furnace slag (GGBFS) obtained by finely grinding blast furnace slag (granulated blast furnace slag) having a high glassification rate alone or a mixture of ground granulated blast furnace slag and Portland cement etc.

Granulated blast furnace slag is a granular material containing a large amount of glass produced by water cooling blast furnace slag in a molten state at 1300 to 1500° C. so as to rapidly cool it. This granulated blast furnace slag is ground by a grinding mill to a specific surface area of 3000 cm$^2$/g or more, in the case of a high activity product, 4000 to 6000 cm$^2$/g. The ground granulated blast furnace slag is used as a cement material.

Note that, blast furnace slag is inorganic matter of numerous ingredients produced as a byproduct when producing pig iron at an ironmaking blast furnace. In general, it contains $SiO_2$ in 30 to 35 mass %, CaO in 40 to 45 mass %, MgO in 2 to 8 mass %, and $Al_2O_3$ in 6 to 18 mass % and further contains, as trace ingredients, $TiO_2$, CaS, FeO, etc.

If using granulated blast furnace slag with a glassification rate of 95% or more, good performance blast furnace slag cement can be produced.

If the water mixed in is alkali, the CaO and $Al_2O_3$ contained in the ground granulated blast furnace slag leach out from the powder into the water causing a hydration reaction contributing to the curing of the cement structure.

However, under conditions where the water is neutral or acidic, the ground granulated blast furnace slag is extremely slow in the setting reaction, so except for special cases, Portland cement and other mixed cement obtained by mixing strongly alkaline cement and ground granulated blast furnace slag is used.

In general, cement containing ground granulated blast furnace slag in a rate of 30 mass % or less has functions substantially equal to those of the cement mixed in. That is, the thus produced cured cement has an initial strength and final strength substantially equal to those of the cement mixed in. This mixed cement can be used for replacement of Portland cement in the building and civil engineering fields.

Further, cement containing ground granulated blast furnace slag in 30 to 70 mass % is slow in initial setting of the cured cement, but is high in final strength, is low in heat generation, and has other features, so is used for large-scale structures and civil engineering.

In this way, the ratio of mixture of the ground granulated blast furnace slag is changed in accordance with the application of the cement.

Further, blast furnace slag cement has a high seawater resistance and further an alkali aggregate reaction suppression effect etc. It is strong in durability in various adverse environments, so is used for wave-breaker blocks, bridge trestle concrete, etc.

Note that blast furnace slag includes low alumina slag ($Al_2O_3$:12% or less) and high alumina slag ($Al_2O_3$:12% or more).

High alumina ground granulated blast furnace slag releases a large amount of aluminum ions forming hydrates when the concrete cures. As a result, the concrete or mortar becomes higher in strength, so it is possible to produce good quality blast furnace slag cement from ground granulated blast furnace slag using high alumina blast furnace slag as a material.

In this way, blast furnace slag cement using high alumina ground granulated blast furnace slag has a high final strength as cured cement, so can be said to be superior in quality.

However, cement comprised of mainly high alumina ground granulated blast furnace slag and Portland cement sometimes expands over a long period from several years to 10 or more years after curing in soil containing sulfates due to the effect of the sulfate ions.

Aluminum ions are leached from the alumina in the blast furnace slag. Further, calcium ions are leached from the lime ingredients contained in the blast furnace slag and Portland cement. The calcium ions react with the sulfate ions, form sulfates, and finally form ettringite. This ettringite further reacts with the eluted aluminum ions and forms monosulfates of aluminum and calcium (monosulfate salts).

If after this concrete cures, sulfate ions further permeate it, the monosulfate salts and sulfate ions react whereby ettringite is again formed. At this time, the concrete increases in volume, so the cement concrete swells. In the worst cases, the concrete swells so much that the structure is destroyed.

Note that acid sulfate soil is mostly at regions in proximity to volcanoes and some coastal regions in Japan. Further, overseas, it is prevalent at dry regions such as the Middle East, the North American coast, etc. Among these soils, calcium sulfate, magnesium sulfate, sodium sulfate, etc. remain residually in the soil. Due to the effect of erosion of the cement concrete by the sulfates, the problem of degradation due to expansion of the cement concrete contacting the soil easily occurs.

To solve the problem of damage to the concrete structure by this sulfate expansion, Portland cement with low calcium aluminate resistant to sulfate expansion is mixed in with the blast furnace slag cement and the mixture used.

Further, in applications with particularly large effects of sulfates, sometimes the ratio of mixture of the high alumina ground granulated blast furnace slag is made 60 mass % or more, preferably 70 mass % or more.

The principle in the thinking in handling this is that since the Portland cement ratio falls and the leaching of calcium ions of the Portland cement is reduced, the balance of aluminum ions and calcium ions changes thereby creating a state in which the calcium ions required for formation of ettringite become insufficient and therefore the formation of ettringite can be prevented.

In mixed cement made of high alumina ground granulated blast furnace slag and Portland cement as main materials, various measures have been taken to prevent sulfate expansion.

For example, with the measure of using low alumina Portland cement and making the ratio of mixture of the ground granulated blast furnace slag 60 mass % or more, preferably 70 mass % or more, it was possible to suppress concrete expansion in a sulfate environment more than the case of Portland cement alone, but the initial setting of the concrete was slow. As a result, this cement could only be used for structures where slow initial setting is acceptable, that is, dams, embankments, and some other civil engineering applications. Therefore, with this measure, there was the problem that use for making concrete panels or tunnel segments and for concrete applications for building foundations was not possible.

Further, as the method for suppression of concrete expansion due to sulfates, for example, as described in Japanese Patent Publication (A) No. 8-12387, the practice has been to add sulfate ions reacting with the aluminum ions initially leached from the ground granulated blast furnace slag in advance in fresh concrete.

This method formed the ettringite at an early timing, that is, before the expression of the concrete strength, so as to reduce the formation of ettringite after curing of the concrete. Specifically, a large amount of plaster ($CaSO_4$, sometimes anhydrous crystals and hydrous crystals) was added to the blast furnace slag cement to suppress the expansion under a sulfate environment.

However, in blast furnace slag cement including ground granulated blast furnace slag in an amount of 10 to 60 mass %, to raise the sulfate durability, even in the case of cement in which Portland cement with its greatest effect of suppression of sulfate expansion is mixed, it was necessary to making the amount of addition of plaster to the total amount of cement over 4 mass % converted to $SO_3$.

However, the sulfate ions leached from the plaster further have the effect of delaying the cement setting, so if increasing the amount of addition of plaster, there was the problem that the extremely early setting of the concrete (within 1 to 3 days) became slow. As a result, applications requiring early setting, that is, applications to building foundations, concrete panels, tunnel segments, etc. were difficult.

Further, in concrete produced by cement in which a large amount of plaster is added, there was also the problem of a drop in the final strength. To suppress this effect, it was necessary to add plaster under conditions of 4 mass % or less converted to an $SO_3$.

That is, in the prior art, there was never a method simultaneously solving the problems of the conditions of the concrete setting speed of mixed cement of high alumina ground granulated blast furnace slag and Portland cement and sulfate expansion.

Further, as a method of production of concrete with a high durability in an environment with many sulfate ions present and further in an acidic environment, for example as described in Japanese Patent Publication (A) No. 2005-35877 and Japanese Patent Publication (A) No. 2004-59396, it is described to add, in addition to cement, blast furnace slag powder with a 100 micron or less particle size, steelmaking slag powder, and slag aggregate with a glassification rate 10% or less.

However, this method improved the sulfuric acid resistance of concrete due to the mixing of materials at the time of laying the concrete. It did not improve the sulfate resistance performance of the cement itself. Therefore, in this method, application to locations where only general aggregate can be obtained and structures requiring use of high strength aggregate was difficult.

By using blast furnace slag as a raw material for blast furnace slag cement, it is possible to use the byproduct blast furnace slag produced in ferrous metal production as a high added value industrial raw material and possible to efficiently utilize resources and conserve on energy.

However, to expand this application, it was necessary to raise the durability of blast furnace slag cement using high alumina ground granulated blast furnace slag in an acid sulfate soil, but there has never been prior art satisfying the criteria of both this object and the cement setting performance.

Therefore, to overcome these defects in the prior art, technology for production of blast furnace slag cement having both a high sulfate resistance performance and a setting performance equal to that of conventional cement has been sought.

DISCLOSURE OF THE INVENTION

The present invention was made for solving the technical problems in cement described above. The details of the technology are as described in (1) to (9).

(1) In mixed cement containing mainly ground granulated blast furnace slag and Portland cement, the ratio of mixture of ground granulated blast furnace slag having an alumina content of 12 to 17.5 mass % is made 10 to 60 mass %. Further, plaster having a specific surface area of 7000 $cm^2/g$ or more is added to the mixed cement. The plaster may be either anhydrous plaster or hydrate plaster. The ratio of addition is 2 to 4 mass % with respect to the total mass of the mixed cement converted to $SO_3$ mass. Mixed cement of the above ratio of mixture is used as the raw material for cement concrete of a building or civil engineering structure in contact with soil affected by sulfates.

(2) In mixed cement containing mainly ground granulated blast furnace slag and Portland cement, the ratio of mixture of the ground granulated blast furnace slag having an alumina content of 12 to 17.5 mass % is made 10 to 60 mass % and plaster having a specific surface area of 7000 $cm^2/g$ or more is mixed into the mixed cement under conditions of 4 mass % or less converted to $SO_3$ mass and under conditions of a value calculated by the product of the specific surface area of the plaster and ratio of mixture by $SO_3$ conversion (unit: $cm^2/g.\%$ $SO_3$) of 15000 or more with respect to the cement mixture.

(3) In the same way as the above (1) and (2), in mixed cement containing mainly ground granulated blast furnace slag and Portland cement having an alumina ratio of 12 to 17.5 mass %, the ratio of mixture of the ground granulated blast furnace slag is made 10 to 60 mass % and plaster is added to the mixed cement in a ratio (converted to $SO_3$ mass) of 2 to 4 mass %. Further, 20 to 80 mass % of the plaster is made a specific surface area of 8000 to 30000 $cm^2/g$, while the remaining plaster is made a specific surface area of 3500 to 6500 $cm^2/g$.

(4) In each of the above (1) to (3), the ground granulated blast furnace slag is made one having a basicity B calculated using the contained ingredients (=(CaO mass %+$Al_2O_3$ mass %+MgO mass %)/($SiO_2$ mass %)) of 1.7 to 2.0 and a specific surface area (S) of 3500 to 5000 $cm^2/g$.

(5) In each of the above (1) to (4), as Portland cement with a high durability against sulfates, one with a calcium aluminate ($3CaO._2O_3$) content of 8 mass % or less and a total of calcium aluminate and tricalcium silicate ($3CaO.SiO_2$) of 58 mass % or less is mixed in so as to obtain sulfate resistant cement with good sulfate resistance performance.

(6) In each of the above (1) to (4), the calcium aluminate content of the Portland cement mixed in is made 5 mass % or less and the total of two times the mass of the calcium aluminate and the mass of the calcium aluminate and ferrite is made a content of 20 mass % or less to obtain a sulfate resistant cement with a particularly good sulfate resistance performance.

(7) In each of the above (1) to (6), the basicity B and the specific surface area (S: $cm^2/g$) used for the ground granulated blast furnace slag used for the sulfate resistant cement are made to satisfy a relation of 5500-980B<S<6280-980B by making both the setting characteristics and sulfate resistance performance of the sulfate resistant cement suitable ranges.

(8) With the formulation described above, cement of an extremely high sulfate resistance performance in the sulfate resistant cement described in (6) is produced. Ground granulated blast furnace slag having a specific surface area of 3500 to 4400 $cm^2/g$, an alumina content of 12 to 17.5 mass %, and a basicity B of 1.76 to 2.0 is used as a material. Further, Portland cement with a calcium aluminate content of 5 mass % or less and a total of two times the mass of calcium aluminate and the mass of calcium aluminate and ferrite of a content of 20 mass % or less is used as a material. The ratio of the ground granulated blast furnace slag when indexed to the total mass of the ground granulated blast furnace slag and the Portland cement as 100 is made a ratio of 20 to 60 mass %. Plaster with a specific surface area of 7000 $cm^2/g$ or more is added to this cement mixture in a ratio of 2 to 4 mass % converted to $SO_3$ mass.

(9) Calcium carbonate has the effect of suppressing the formation of ettringite after the end of setting due to the reaction with the plaster, so it is possible to add 0.2 to 5 mass % of calcium carbonate powder to the sulfate resistant cement as set forth in any one of said (1) to (8) so as to enhance the sulfate resistance performance.

By using the sulfate resistant cement according to the present invention to produce a concrete structure, it is possible to prevent the abnormal expansion of this concrete structure even under conditions of contact with soil with residual sulfates or water containing sulfate ions.

BEST MODE FOR CARRYING OUT THE INVENTION

Figure 1:
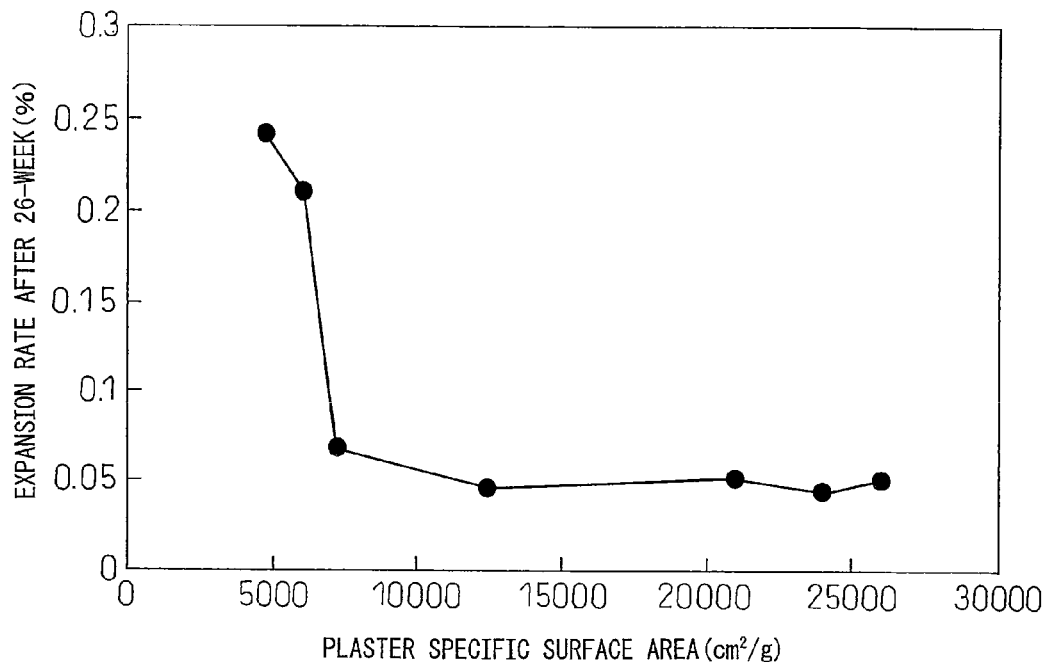
FIG. 1 is a view showing the results of a sulfate resistance performance test on mortar comprised of a cement mixture containing 25 mass % ground granulated blast furnace slag to which 5000 to 26000 $cm^2/g$ plaster is added in 3 mass %.

The high alumina granulated blast furnace slag used for the sulfate resistant cement of the present invention is comprised of a lime ingredient (CaO) in 38 to 45 mass %, a silica ingredient ($SiO_2$) of 30 to 35 mass %, and alumina ($Al_2O_3$) of 12 to 17.5 mass %.

Further, it contains magnesia (MgO) in 3 to 8 mass % and trace amounts of $TiO_2$, FeO, CaSm, or other inorganic matter.

Blast furnace slag in a 1300 to 1500° C. molten state is charged into water to obtain granulated blast furnace slag with a glassification rate of 95% or more.

The granulated blast furnace slag was a granular substance with a mean particle size of 0.5 to 3 mm or so. The higher the granulated blast furnace slag in glassification rate, the higher the reaction activity of the cement, so it is more effective if the raw material of the sulfate resistant cement of the present invention has a glassification rate of 95% or more, preferably 98% or more.

The range of chemical ingredients of the ground granulated blast furnace slag to which the present invention is applied is first alumina of 12 to 17.5 mass %.

The amount of alumina is made this range for the following reason.

With a mixture of ground granulated blast furnace slag with this range of alumina content and Portland cement, the sulfate ions in the water react with the aluminum ions and calcium ions leached out at the initial period of setting to thereby form ettringite in the concrete. After this, further aluminum ions leach out and the ettringite becomes a monosulfate aluminum and calcium salt (monosulfate salts).

Over a long period after curing, the sulfate ions react with the monosulfate salts to again form ettringite. At this time, hydrate expansion occurs and the cured cement expands. As a result, the problem of sulfate expansion of the concrete or mortar occurs.

In this regard, on the other hand, there are the advantages that the ground granulated blast furnace slag of this ingredient contributes to the hydration/curing reaction of alumina and the strength of the concrete or mortar becomes high, so if solving the problem of sulfate expansion, a superior cement material results.

In this regard, the ground granulated blast furnace slag covered by the present invention is made an alumina content of 12 to 17.5 mass %.

This granulated blast furnace slag may be ground by a grinding mill to a ground granulated blast furnace slag. Any type of grinding mill is acceptable, but a vertical mill comprised of a table rotating in the horizontal plane and a plurality of rollers or a ball mill, rod mill, vibration mill, may be used for grinding.

This ground granulated blast furnace slag preferably has a specific surface area of 3500 $cm^2/g$ or more. If the specific surface area is too small, the ground granulated blast furnace slag falls in reactivity and the concrete strength becomes lower, so it is preferable to use a 3500 $cm^2/g$ or higher specific surface area ground granulated blast furnace slag.

Further, on the other hand, if the ground granulated blast furnace slag becomes too high in specific surface area, the amount of aluminum ions leached out in the initial period of setting becomes too great and sometimes a large amount of monosulfate salts are produced from ettringite after concrete curing. Therefore, if making the specific surface area 6000 $cm^2/g$ or less, the effect of the present invention becomes larger.

Note that, the "specific surface area" described in the Description is obtained by the method of running air into powder in a column and measuring the air flow rate and pressure difference to find the specific surface area, that is, the so-called Blaine method.

Portland cement and plaster powder are mixed with this ground granulated blast furnace slag to produce mixed cement (blast furnace slag cement).

The crystal structure of the Portland cement is comprised of dicalcium silicate ($2CaO \cdot SiO_2$: below, referred to as "C2S") in 10 to 40 mass %, tricalcium silicate ($3CaO \cdot SiO_2$: below, referred to as "C3S") in 40 to 70 mass %, calcium aluminate ($3CaO \cdot Al_2O_3$: below, referred to as "C3A") in 11 mass % or less, and calcium aluminoferrite ($4CaO \cdot Al_2O_3 \cdot Fe_2O_3$: below, referred to as "C4AF") in 6 to 18 mass %. Further, manganese oxide, phosphorus oxide, etc. are included as trace ingredients.

In this Portland cement, in the present invention, as Portland cement having a high sulfate resistance performance, one with a C3A content of 8 mass % or less and a total of C3A and C3S of 58 mass % or less is used.

Further, as Portland cement when a particularly high sulfate resistance performance is sought, one with a C3A content of 5 mass % or less and a total of two times the mass of C3A and the mass of C4AF of 20 mass % or less is used.

The Blaine values of these Portland cements are 3000 to 4000 $cm^2/g$ or so.

To work the present invention, the ground granulated blast furnace slag itself should have a performance enabling strength to be suitably expressed. For this reason, the relationship of the ingredients of the ground granulated blast furnace slag is a basicity B [=(CaO mass %+$Al_2O_3$ mass %+MgO mass %)/($SiO_2$ mass %)] of 1.7 or more, preferably 1.7 to 2.0.

This basicity B is a factor affecting the activity of the ground granulated blast furnace slag. By setting a suitable ratio of the main ingredients causing the hydration reaction, that is, the lime ingredient and alumina ingredient, and the silica ingredient curing these ingredients and preventing leaching of ions, the conditions are set for ground granulated blast furnace slag with a high expression of concrete strength.

Note that magnesium oxide affects the basicity of the slag. If this is included in large an amount, the hydration reactivity is high.

The ratio of mixture of the ground granulated blast furnace slag in the cement mixture is made 10 to 60 mass %. Note that, here, the mixture of only Portland cement and ground granulated blast furnace slag is defined as the "cement mixture".

The reason for defining the ratio of the ground granulated blast furnace slag as 10 mass % or more is that if 10 mass % or less, the sulfate resistance performance of the cement mixture becomes substantially equal to that of the Portland cement mixed in and there is no need for use of the art of the present invention.

To confirm this, the inventors investigated the sulfate resistance performance when changing the ratio of mixture of the ingredients in a cement mixture of a high alumina ground granulated blast furnace slag (GGBFS1described in later Table 1) and a high sulfate resistance Portland cement (PC3 described in later Table 2). Note that, in this cement mixture, anhydrous plaster with a 5,100 $cm^2/g$ specific surface area is mixed in by 2 mass % converted to $SO_3$.

Mortar bars prepared by changing the ratio of mixture were immersed for 26 weeks in a 5% sodium sulfate aqueous solution, then measured for expansion in length. As a result, when the ratio of mixture of the GGBFS1 was 10 mass % or less, there was almost no increase in the expansion rate. That is, with this ratio of mixture, there is little formation of ettringite due to the alumina in the ground granulated blast furnace slag, so it was confirmed that the effect of application of the present invention is small.

Further, the reason for defining the ratio of the ground granulated blast furnace slag as 60 mass % or less is that if the ratio of mixture is over 60 mass %, the ratio of Portland cement falls and the amount of leaching of calcium ions from the Portland cement is reduced, so after setting, there are insufficient calcium ions required for formation of ettringite in the concrete. Further, a large amount of hydrates including aluminum is formed in the concrete, so the sulfate ions react with these hydrates. Therefore, the reaction from monosulfate salts to ettringite is slow. For this reason, the sulfate resistance performance of the cement mixture becomes equal to or better than that of the mixed in Portland cement. In this case as well, the art of the present invention does not have to be used.

Therefore, due to the above reasons, the present invention has technical meaning in the range of the ratio of mixture of the ground granulated blast furnace slag of 10 to 60 mass %.

Plaster powder is mixed into a cement mixture of a ratio of ground granulated blast furnace slag of 10 to 60 mass % of the range covered by the present invention.

As the plaster, an anhydrate and hydrate of $CaSO_4$ can be used. That is, anhydrous plaster, hemihydrate plaster, dihydrate plaster, etc. may be used. However, a content of Type II anhydrous plaster with a large dissolution rate of 50% or more is more preferable.

In the present invention, the plaster has a specific surface area of 7000 $cm^2/g$ or more, preferably 7000 to 24000 $cm^2/g$. The ratio of mixture of the plaster powder is made 2 to 4 mass % converted to $SO_3$.

Note that, usually, for the purpose of delaying the initial setting, the plaster added to the cement is given specific surface area of about 3000 to 5500 $cm^2/g$. This is coarser than the plaster used in the present invention.

The reason for making the plaster added to the cement mixture larger in specific surface area is as follows.

The inventors ran experiments to investigate the effects of the amount of addition of plaster and found the following facts. Note that, for the cement mixture, a mixture of a high sulfate resistance Portland cement (PC3) and ground granulated blast furnace slag (GGBFS1) was used and dehydrate plaster with a specific surface area of 5200 $cm^2/g$ was used.

If increasing the ratio of addition of plaster, the expansion rate of the mortar bars in the sodium sulfate aqueous solution was reduced. That is, the effect of prevention of reformation of ettringite after curing contributing to the sulfate resistance performance was found to be affected by the amount of addition of plaster, that is, the amount of leaching of $SO_4$ ions. Note that, the ratio of mixture of ground granulated blast furnace slag in the experiments was 25 mass %.

Regarding the expansion rate of a mortar bar in immersion in a 4% sodium sulfate aqueous solution after 26 weeks, if the rate of addition of plaster is 1 to 2 mass % converted to $SO_3$, the expansion rate becomes 0.3% or more. If 2.5 mass %, the expansion rate becomes 0.2% or more. Further, if the rate of addition is 3 to 4 mass % converted to $SO_3$, this is improved to 0.1 to 0.2% or so, but not to the generally demanded 0.1% or less. On the other hand, with a rate of addition of 4 mass % or more, the expansion rate becomes just 0.05 to 0.1% or so or a value close to the expansion rate (0.05%) of high sulfate resistance Portland cement. That is, in a cement mixture of high sulfate resistant cement and high alumina ground granulated blast furnace slag, it is learned that the conditions preventing the problem of sulfate expansion can be achieved by addition of 4 mass % or more of plaster converted to $SO_3$. In this way, the effect of suppression of sulfate expansion by plaster was remarkable.

The inventors ran experiments on mortar setting and curing by cement mixtures the same as the above and as a result found that when the amount of addition of plastic is less than 4 mass % converted to $SO_3$, excessive mortar setting is not seen within 6 hours and the effect of prevention of initial setting of normal fresh concrete is obtained. Furthermore, after 28 days, the mortar had a sufficient compressive strength of about $50N/mm^2$. In all results, the results were substantially equivalent to those of mortar of general Portland cement.

However, with addition of 4 to 6 mass % of plaster converted to $SO_3$, the effect of the plaster was sufficient and no drop in fluidity of the fresh concrete could be confirmed, but there was the problem that the reaction of cement and plaster becomes excessive, the initial setting is delayed, and the concrete falls in strength 1 to 3 days after being laid. Therefore, it was confirmed that by just increasing the ratio of addition of plaster powder, it is not possible to achieve both the sulfate resistance performance and concrete strength.

Therefore, the inventors ran experiments changing the specific surface area of the plaster powder to investigate the sulfate resistance performance and initial strength of mortar. In these experiments, they used cement mixtures of the same formulation as the above experiments and added 5000 to 26000 $cm^2/g$ plaster in an amount of 3 mass %. The results are described in FIG. 1.

In experiments adding 7000 $cm^2/g$ plaster in a ratio of 3 mass % in a cement mixture of high alumina ground granulated blast furnace slag and high sulfate resistant cement, with cement mixtures in which plaster of the conventional powder degree (about 5000 $cm^2/g$) was added, there was less expansion of the mortar bar in the sodium sulfate aqueous solution. In 26-week immersion tests in a sodium sulfate aqueous solution, the expansion rate became 0.08% (judgment criteria of 0.1% or less).

Further, in experiments immersing cement mixtures containing 12500 $cm^2/g$ and 21000 $cm^2/g$ plaster for 26 weeks in a sodium sulfate aqueous solution, the expansion rate was only about 0.05%.

In this way, in a cement mixture to which plaster of a 7000 $cm^2/g$ or more specific surface area is added, the sulfate resistance performance is improved. Further, in the case of adding 7000 $cm^2/g$ or more plaster, the mortar initial strength (after 1 to 7 days) is also improved. However, if the plaster has a specific surface area of 24000 $cm^2/g$ or more, the small problem arose that the mortar final strength fell somewhat. Therefore, in the present invention, the condition is that the plaster added to the cement has a specific surface area of 7000 $cm^2/g$ or more, more preferably 7000 to 24000 $cm^2/g$.

The inventors added plasters of 7500, 12500, and 21000 $cm^2/g$ specific surface areas to a cement mixture of high alumina ground granulated blast furnace slag (GGBFS1) and high sulfate resistant cement (PC3) of a 25:75 ratio and investigated the sulfate resistance performance and initial strength.

In these experiments, they changed the ratios of addition of the plasters in the range of 1 to 6 mass % (converted to $SO_3$).

As a result, in the case of each plaster powder, with a rate of addition of less than 2 mass % (converted to $SO_3$), the effect of improvement of the sulfate resistance was small. In the case of 2 mass % or more, in the case of each plaster powder, the expansion rate at the time of 26-week immersion in a sodium sulfate aqueous solution became 0.1% or less, that is, a satisfactory sulfate resistance result was obtained. By raising the specific surface area, the ratio of addition of plaster able to suppress sulfate expansion was reduced from 3 to 2 mass % (converted to $SO_3$).

Further, with an amount of addition of plaster of 2 to 6 mass % (converted to $SO_3$), in each case, the expansion rate at the time of 26-week immersion in a sodium sulfate aqueous solution became a good 0.09% or less. However, if the rate of addition of plaster exceeds 4 mass % (converted to $SO_3$), it was confirmed that the fresh concrete falls in fluidity.

Therefore, in the present invention, the condition enabling both the sulfate resistance performance and fresh concrete fluidity to be satisfied is a ratio of addition of plaster of 2 to 4 mass % (converted to $SO_3$).

If observing the hydrate of the cement mixture of the present invention, it was found that after mixing with water, the fine plaster quickly dissolves, so there is a sufficient amount of sulfate ions at the initial period of setting for preventing conversion from ettringite to monosulfate salts.

As a result, even if adding further dissolved aluminum ions to the ettringite formed at the initial period, sulfate ions able to sufficiently react with these are present in the water, so the aluminum ions become ettringite and monosulfate salts are difficult to form. Therefore, after the mechanism of sulfate expansion, that is, the setting, the amount of monosulfate salts becoming ettringite is reduced. This is due to the fact that if fine plaster is used, sulfate expansion can be suppressed.

Therefore, it is important to increase the supply of sulfate ions at the initial period of setting. For this purpose, the dissolution rate of the plaster during this period (amount of dissolution/time) is increased to obtain a continuous state of excess sulfate ions. The dissolution rate of the plaster in the extreme initial period is affected by the interfacial area between the plaster and water, that is, the product of the ratio of mixture and specific surface area of the plaster.

Therefore, the inventors calculated the index corresponding to the surface area of the plaster (specific surface area index) by the product of the ratio of mixture of plaster (converted to $SO_3$) and the specific surface area ($cm^2/g$) and investigated the relationship between the value of this specific surface area index and sulfate resistance performance.

As a result, it is learned that if this value is 15000 $cm^2/g \cdot \%$ $SO_3$ or more, the expansion rate in an ASTM sulfate expansion test becomes substantially the same between a cement in which GGBFS is not mixed and cement in which GGBFS is mixed in the range of the present invention.

Further, as a method for further improving the effect of improvement of the sulfate resistance performance of the plaster, it is better to further mix in and use plasters of different specific surface areas. If using plaster of a 8000 to 30000 $cm^2/g$ specific surface area (20 to 80%) and plaster of 3500 to 6500 $cm^2/g$ (80 to 20%) mixed together, the effect of improvement of the sulfate resistance performance of fine sized plaster and the effect of suitable delay of the initial setting with large sized plaster are simultaneously obtained, so this is more preferable.

Further, by setting the specific surface area of the ground granulated blast furnace slag to a suitable range, the effect of the present invention becomes larger.

First, as explained above, to maintain the reactivity, it is important that the ground granulated blast furnace slag have a specific surface area of 3500 $cm^2/g$ or more. On the other hand, if the ground granulated blast furnace slag becomes higher in specific surface area, even after setting, the leaching of aluminum ions from the ground granulated blast furnace slag becomes greater and ettringite is produced, so in the present invention, the sulfate resistance performance of the concrete falls.

Therefore, the ground granulated blast furnace slag should be made one with a specific surface area of 6000 $cm^2/g$ or less. When a particularly high sulfate resistance performance is required, the ground granulated blast furnace slag should be made one with a specific surface area of 4400 cm²/g or less.

In the present invention, to improve the sulfate resistance performance, it is important to control the amount of leaching of the aluminum ions from the ground granulated blast furnace slag. So far as the conditions for expression of strength permits, the ground granulated blast furnace slag should have a low specific surface area.

Therefore, by lowering the specific surface area of the ground granulated blast furnace slag as much as possible under conditions maintaining the cement activity, the effect of the present invention can be increased more.

Therefore, adjusting the specific surface area of the ground granulated blast furnace slag in accordance with the indicator of the reactivity, that is, a high basicity B, is also in the scope of the present invention.

The inventors investigated the relationship between the basicity B and specific surface area S (unit: cm²/g) of ground granulated blast furnace slag and as a result learned that under conditions of 5500-980B<S<6280-980B, the effect of the present invention can be increased. Specifically, when granulated blast furnace slag is granulated blast furnace slag having a basicity B of 1.78 to 2.0, if making the specific surface area a range of 3500 to 4400 cm²/g, the effect of the present invention can be increased more.

By satisfying these conditions and mixing the raw materials under the following conditions, it is possible to produce blast furnace slag cement with an extremely high sulfate resistance performance.

For this reason, ground granulated blast furnace slag with a specific surface area of 3500 to 4400 cm²/g, an alumina content of 12 to 17.5 mass %, and a basicity B of 1.76 to 2.0 is used. Further, Portland cement with a calcium aluminate content of 5 mass % or less and a total of two times the mass of the calcium aluminate and the mass of calcium aluminate and ferrite of 20 mass % or less is used.

The ratio of the ground granulated blast furnace slag when indexed to the total mass of the ground granulated blast furnace slag and Portland cement as 100 is made 20 to 60 mass %. Plaster with a 7000 cm²/g or more specific surface area is added to this cement mixture in a ratio of 2 to 4 mass % (converted to $SO_3$).

This blast furnace slag cement has a sulfate resistance performance similar to high sulfate resistance Portland cement. Further, high specific surface area plaster also has the effect of improvement of the concrete initial strength of blast furnace slag cement. This is due to the formation of suitable strength ettringite at the initial period of concrete setting.

From this, with a rate of mixture of 20 to 60 mass % of ground granulated blast furnace slag, an initial strength and final strength of the concrete equal to those of ordinary Portland cement are obtained.

When adding 0.2 to 5 mass % of calcium carbonate powder to the cement mixture of the present invention, the effect of the present invention becomes greater. This mixture releases a larger amount of calcium ions into the water at the initial period of setting of the, mortar or concrete whereby sufficient ettringite is formed and unreacted aluminum ions are reduced from the water before the strength increases. Due to this, after setting, the aluminum ions are reduced and expansion due to formation of ettringite is prevented.

Note that, as the calcium carbonate powder, use of limestone crushed to 2500 to 6000 cm²/g or so is economical.

The blast furnace slag cement of the present invention may have further mixed into it fumed silica, fine ash from power stations, dust from ferrous metal furnaces, and other cement alternatives contributing to the expression of concrete strength.

However, in cement in which these are mixed, there are the problems of delays in the curing reaction of the concrete structure and the drop in the final strength, so the ratio of mixture of these substances in the cement mixture is preferably made 25 mass % or less.

Below, examples of the present invention will be explained, but the conditions employed in the examples are illustrations for confirming the workability and effect of the present invention. The present invention is not limited to these examples. Various conditions may be employed so long as not departing from the present invention and achieving the object of the present invention.

EXAMPLES

The physical properties of chemical ingredients of the ground granulated blast furnace slag, Portland cement, and plaster used in the examples of the present invention are shown in Table 1 to Table 3.

GGBFS1 contains alumina in 13.4 mass % and has a basicity B of 1.74. GGBFS2 and GGBFS3 contain alumina in 15.4 mass % and have basicities B of 1.80. GGBFS2 has a high specific surface area, while GGBFS3 has a somewhat low specific surface area. Further, GGBFS4 contains alumina in 16.8 mass % and has a basicity B of 1.89.

The Portland cement PC1 was ordinary Portland cement produced without considering the sulfate resistance performance. PC2 and PC3 were both produced considering the sulfate resistance performance. PC2 is a product equivalent to Type 2 cement defined in ASTM, while PC3 is a product equivalent to Type 5 cement defined in ASTM having a high sulfate resistance performance.

The mixing use plaster is naturally obtained plaster ground to a specific surface area of 4000 cm²/g (plaster 1), 7500 cm²/g (plaster 2), 10000 cm²/g (plaster 3), and 21000 cm²/g (plaster 4). Note that the plasters 2, 3, and 4 all contained 80 mass % or more of Type II anhydrous plaster. In particular, the plaster 3 contained 95 mass % of Type II anhydrous plaster.

TABLE 1

| | Chemical ingredients (mass %) | | | | Basicity | Specific surface |
|---|---|---|---|---|---|---|
| | $Al_2O_3$ | CaO | MgO | $SiO_2$ | B | area cm²/g |
| GGBFS1 | 13.4 | 42.6 | 4.8 | 34.9 | 1.74 | 4640 |
| GGBFS2 | 15.4 | 41.3 | 5.3 | 34.4 | 1.80 | 4580 |
| GGBFS3 | 15.4 | 41.3 | 6.4 | 33.6 | 1.88 | 4120 |
| GGBFS4 | 16.8 | 41.1 | 5.4 | 33.5 | 1.89 | 3670 |

TABLE 2

| | Crystal system (mass %) | | | | Specific surface area cm²/g | 26-week expansion in sulfate aqueous solution (%) | 28-day strength N/mm² |
|---|---|---|---|---|---|---|---|
| | C2S | C3S | C3A | C4AF | | | |
| PC1 | 19 | 56 | 11 | 9 | 3180 | 0.35 | 50 |
| PC2 | 11 | 63 | 7 | 10 | 3320 | 0.083 | 48 |
| PC3 | 19 | 61 | 2 | 13 | 3410 | 0.045 | 48 |

TABLE 3

| | Type | CaSO$_4$ ratio mass % | Specific surface area cm$^2$/g |
|---|---|---|---|
| Plaster 1 | Dihydrate | 75.8 | 4000 |
| Plaster 2 | Anhydrous | 94.8 | 7500 |
| Plaster 3 | Anhydrous | 94.8 | 10000 |
| Plaster 4 | Anhydrous | 94.8 | 21000 |

Using mortars of Portland cement alone and cement mixtures shown in Table 4 and Table 5, the compressive strengths after 1 week and after 4 weeks were found and a mortar bar expansion test involving 26-week immersion in a 5% sodium sulfate aqueous solution (method based on measurement method defined in ASTM) was performed. The results are shown in the same Table 4 and Table 5.

TABLE 4

| | Ex. 1 | Ex. 2 | Ex. 3 | Ex. 4 | Ex. 5 | Ex. 6 | Ex. 7 |
|---|---|---|---|---|---|---|---|
| Ground granulated blast furnace slag type | GGBFS1 | GGBFS1 | GGBFS1 | GGBFS2 | GGBFS3 | GGBFS3 | GGBFS3 |
| Ground granulated blast furnace slag ratio (mass %) | 25 | 25 | 25 | 25 | 25 | 25 | 25 |
| Ground granulated blast furnace slag specific surface area (cm$^2$/g) | 4640 | 4640 | 4640 | 4580 | 4120 | 4120 | 4120 |
| Portland cement type | PC2 | PC2 | PC2 | PC3 | PC1 | PC2 | PC3 |
| Portland cement ratio (%) | 75 | 75 | 75 | 75 | 75 | 75 | 75 |
| Plaster type | G2 | G3 | G4 | G3 | G3 | G3 | G3 |
| Plaster specific surface area (cm$^2$/g) | 7500 | 10000 | 21000 | 10000 | 10000 | 10000 | 10000 |
| Plaster ratio (% SO$_3$) | 2.4 | 4.0 | 2.2 | 2.5 | 3.9 | 2.7 | 2.7 |
| Specific surface area index (cm$^2$/g·% SO$_3$) | 18,000 | 40,000 | 46,200 | 25,000 | 39,000 | 27,000 | 27,000 |
| 26-week expansion in sulfate aqueous solution (%) | 0.053 | 0.081 | 0.079 | 0.059 | 0.17 | 0.058 | 0.049 |
| 7-day strength of mortar (N/mm$^2$) | 26 | 27 | 29 | 28 | 30 | 29 | 30 |
| 28-day strength of mortar (N/mm$^2$) | 48 | 50 | 50 | 48 | 51 | 49 | 48 |

TABLE 5

(continuation of Table 4)

| | Ex. 8 | Ex. 9 | Ex. 10 | Ex. 11 | Ref. 1 | Ref. 2 | Ref. 3 |
|---|---|---|---|---|---|---|---|
| Ground granulated blast furnace slag type | GGBFS3 | GGBFS3 | GGBFS4 | GGBFS4 | | | |
| Ground granulated blast furnace slag ratio (mass %) | 50 | 25 | 25 | 50 | | | |
| Ground granulated blast furnace slag specific surface area (cm$^2$/g) | 4120 | 4120 | 3670 | 3670 | | | |
| Portland cement type | PC3 | PC3 | PC3 | PC3 | PC1 | PC2 | PC3 |
| Portland cement ratio (%) | 50 | 75 | 75 | 40 | 100 | 100 | 100 |
| Plaster type | G4 | G1 + G4 | G3 | G3 | G1 | G1 | G1 |
| Plaster specific surface area (cm$^2$/g) | 21000 | 13600 | 10000 | 21000 | 5200 | 5200 | 5200 |
| Plaster ratio (% SO$_3$) | 2.2 | 2.9 | 3.2 | 2.1 | 2.3 | 2.3 | 2.3 |
| Specific surface area index (cm$^2$/g·% SO$_3$) | 46,200 | 39,440 | 32,000 | 44,100 | 11,960 | 11,960 | 11,960 |
| 26-week expansion in sulfate aqueous solution (%) | 0.46 | 0.043 | 0.042 | 0.041 | 0.22 | 0.077 | 0.044 |
| 7-day strength of mortar (N/mm$^2$) | 26 | 28 | 27 | 24 | 30 | 31 | 31 |
| 28-day strength of mortar (N/mm$^2$) | 50 | 52 | 49 | 50 | 50 | 48 | 48 |

Example 1 to Example 3 show the results of GGBFS1 into which intermediate sulfate resistance performance Portland cement (PC2) was mixed. In each case, the expansion rate after 26 weeks of immersion was 0.1% or less. The larger the specific surface area of the plaster added, the lower the expansion rate as a general trend.

Example 4 shows the results of cement comprised of GGBFS1 plus high sulfate resistance performance Portland cement (PC3). Even if relatively high alumina ground granulated blast furnace slag, the expansion rate of the mortar in a sulfate aqueous solution was small.

Note that, the specific surface area indexes of the plasters in the cement mixtures of Example 1 to Example 4 were 18000 to 48200 cm$^2$/g·% SO$_3$ or within the good conditions even in the present invention.

Example 5 to Example 8 are examples of cements using relatively high alumina ground granulated blast furnace slag and relatively small specific surface area materials.

First, as shown in Example 5, in the case of cement mixed with PC1, the expansion rate of the mortar in a sulfate aqueous solution was improved over the case of PC1 alone. In this way, it is also possible to improve the sulfate resistance performance of Portland cement with poor sulfate resistance performance.

Further, as shown from Example 6 to Example 8, if a mixed cement of high sulfate resistance performance PC2 and PC3 and ground granulated blast furnace slag, the expansion rate was kept at a level equal to that of the mortar in a sulfate aqueous solution in the case of Portland cement alone.

Example 9 shows the case of cement to which two types of plaster with different specific surface areas are added. The expansion rate of the mortar in a sulfate aqueous solution in this cement was extremely good.

Note that the specific surface area indexes of the plasters in the cement mixtures of Example 5 to Example 9 were 27000 to 48200 cm$^2$/g·% SO$_3$ or within the good conditions even in the present invention.

Example 10 and Example 11 are examples reducing the specific surface area of the ground granulated blast furnace slag and further improving the sulfate resistance performance. As a result, the expansion rates of the mortar in a sulfate aqueous solution were extremely good. Further, with this mortar sample, there was no drop in the initial strength of the mortar (shown by results over 7 days) as arising when reducing the specific surface area of the ground granulated blast furnace slag. This is because by adding high specific surface area plaster, there was the effect of making up for the drop in activity of the low specific surface area ground granulated blast furnace slag.

Figure 2:
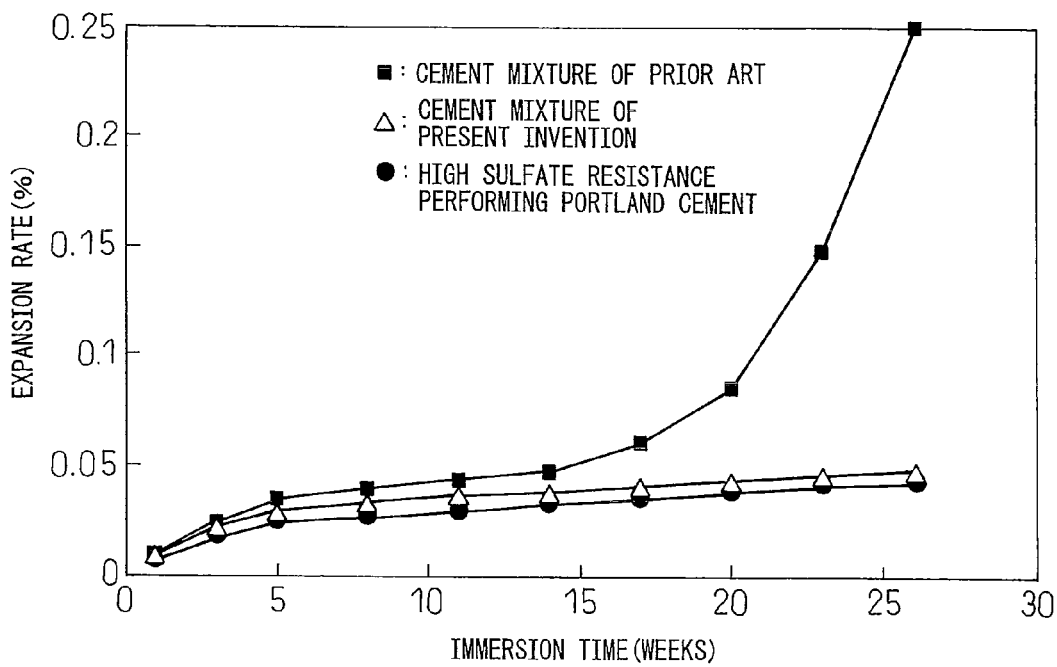
FIG. 2 is a view showing the changes along with time of the expansion rate when immersing high sulfate resistance performance cement products alone, conventional blast furnace slag cement, and the cement mixture of the present invention in a sodium sulfate aqueous solution.

Further, referring to the trends in mortar bar expansion on an immersion test in a sulfate aqueous solution, the changes over time in the expansion rate when immersing mortars of high sulfate resistance performance cement (PC3) alone, prior art blast furnace slag cement (cement mixture containing OP3: 80 mass % and GGBFS2: 20 mass % plus 5,100 cm$^2$/g plaster in an amount of 2.5 mass % (SO$_3$)), and the cement mixture of the present invention (cement mixture containing OP3: 80 mass % and GGBFS2: 20 mass plus 12500 cm$^2$/g plaster in an amount of 2.5 mass % (SO$_3$)) for 26 hours in a sodium sulfate aqueous solution are shown in FIG. 2.

As described in the drawing, in the cement mixture of the prior art, rapid expansion was observed after about 17 weeks of immersion, but in the cement mixture of the present invention, there was only an expansion rate substantially the same as that of high sulfate resistance performance Portland cement. Further, the mortar expansion rate of this cement mixture after 26 weeks was a good 0.05% or less.

Industrial Applicability

The sulfate resistant cement of the present invention can be applied to building foundation concrete, road structures, bridge foundations, tunnel segments, surfaces of river or ocean embankments, concrete building foundation piles, reinforcing mortar or concrete etc. for preventing landslides in tunnels or at slanted surfaces, and almost all other concrete structures in contact with soil containing sulfates or water containing sulfate ions and can prevent abnormal expansion of these concrete structures.

The invention claimed is:

1. A sulfate resistant cement, comprising:
   a mixed cement comprising ground granulated blast furnace slag, Portland cement, and plaster selected from the group consisting of $CaSO_4$, $CaSO_4$-$1/2H_2O$, $CaSO_4$-$2H_2O$, and the combination of $CaSO_4$ and $CaSO_4$-$2H_2O$,
   wherein 10 to 60 mass % of the ground granulated blast furnace slag has an alumina content of 12 to 17.5 mass %;
   wherein said plaster has a specific surface area of 7500 cm$^2$/g or more; and
   wherein the content of SO$_3$ of the plaster is 2 to 4 mass % with respect to the total mass of the mixed cement.

2. A sulfate resistant cement, comprising:
   a mixed cement comprising ground granulated blast furnace slag, Portland cement, and plaster selected from the group consisting of $CaSO_4$, $CaSO_4$-$1/2H_2O$, $CaSO_4$-$2H_2O$, and the combination of $CaSO_4$ and $CaSO_4$-$2H_2O$,
   wherein 10 to 60 mass % of the ground granulated blast furnace slag has an alumina content of 12 to 17.5 mass %;
   wherein said plaster has a specific surface area of 7500 cm$^2$/g or more; and
   wherein the content of SO$_3$ of the plaster is 4 mass % or less with respect to the total mass of the mixed cement; and
   wherein the product with a unit of cm$^2$/g·%SO$_3$, calculated by the specific surface area of the plaster and the content of the SO$_3$ of the plaster is 15000 cm$^2$/g·%SO$_3$ or more.

3. The sulfate resistant cement as set forth in claim 1 or 2, wherein 20 to 80 mass % of the plaster has a specific surface area of 8000 to 30000 cm$^2$/g and the remaining plaster has a specific surface area of 3500 to 6500 cm$^2$/g;
   wherein the content of the plaster is 2 to 4 mass % with respect to the total mass of the mixed cement equivalent to SO$_3$ mass.

4. The sulfate resistant cement as set forth in claim 1 or 2, wherein said ground granulated blast furnace slag has a basicity calculated using the contained ingredients [(CaO mass %+Al$_2$O$_3$ mass %+MgO mass %)/(SiO$_2$ mass %)] of 1.7 to 2.0 and a specific surface area of 3500 to 6000 cm$^2$/g.

5. The sulfate resistant cement as set forth in claim 1 or 2, wherein the Portland cement mixed in has a calcium aluminate content of 8 mass % or less and a total content of calcium aluminate and tricalcium silicate of 58 mass % or less.

6. The sulfate resistant cement as set forth in claim 1 or 2, wherein the Portland cement mixed in has a calcium aluminate content of 5 mass % or less and a total of two times the mass of calcium aluminate and the mass of calcium aluminate-ferrite of 20 mass % or less in content.

7. The sulfate resistant cement as set forth in claim 1 or 2, wherein the ground granulated blast furnace slag has a basicity B and specific surface area S in a relation of 5500-980B<S<6280-980B.

8. The sulfate resistant cement as set forth in claim 6, wherein the wound granulated blast furnace slag has a specific surface area of 3500 to 4400 cm$^2$/g and a basicity B of 1.76 to 2.0, and the Portland cement has a calcium aluminate content of 5 mass % or less and a total of two times a mass of calcium aluminate and a mass of calcium aluminate-ferrite of 20 mass % or less, wherein the content of said ground granulated blast furnace slag when designating the total mass of said mixture of the wound granulated blast furnace slag and said Portland cement as 100 is 10 to 60 mass %, wherein the plaster with a specific surface area of 7500 cm$^2$/g or more is added to the mixture; and wherein the content of SO$_3$ of the plaster is 2 to 4 mass % with respect to he total mass of the mixed cement.

9. The sulfate resistant cement as set forth in claim 1 or 2, wherein the mixed cement comprising ground granulated blast furnace slag and Portland cement further comprises 0.2 to 5 mass % of calcium carbonate powder.

10. A method of preventing the expansion of concrete due to sulfate in concrete structures, comprising the step of:

making the concrete structures with the sulfate resistant cement as set forth in claim 1 or 2.

\* \* \* \* \*

UNITED STATES PATENT AND TRADEMARK OFFICE
CERTIFICATE OF CORRECTION

PATENT NO. : 8,419,851 B2
APPLICATION NO. : 12/530138
DATED : April 16, 2013
INVENTOR(S) : Tetsuharu Ibaraki et al.

It is certified that error appears in the above-identified patent and that said Letters Patent is hereby corrected as shown below:

ON THE TITLE PAGE:

Item (73), Assignee, change:

"(73) Assignee: Nippon Steel & Sumitomo Metal Corporation, Tokyo (JP)"

to

--(73) Assignees: Nippon Steel & Sumitomo Metal Corporation, Tokyo (JP); Nippon Steel Esment Kanto Co., Ltd., Kimitsu-shi, Chiba (JP)--.

Signed and Sealed this
Fifteenth Day of October, 2013

Teresa Stanek Rea
*Deputy Director of the United States Patent and Trademark Office*